United States Patent [19]
Thompson

[11] Patent Number: 6,035,772
[45] Date of Patent: Mar. 14, 2000

[54] NUT CRACKING APPARATUS

[76] Inventor: Mark A. Thompson, Rte. 2 Box 2949, Mineola, Tex. 75773

[21] Appl. No.: 09/396,498

[22] Filed: Sep. 14, 1999

[51] Int. Cl.[7] ............................... A23N 5/00; A23N 5/02
[52] U.S. Cl. ............................. 99/571; 99/572; 99/577; 99/579; 99/581
[58] Field of Search .................. 99/568–583, 600, 99/537–539, 584, 617, 618; 30/120.1, 120.2; 100/158; 241/6, 7, 252; 426/481, 482

[56]             References Cited

U.S. PATENT DOCUMENTS

| | | | |
|---|---|---|---|
| D. 298,099 | 10/1988 | Luc | D7/98 |
| 2,812,793 | 11/1957 | Ford | 99/582 |
| 3,159,194 | 12/1964 | Anderson | 99/578 |
| 3,435,863 | 4/1969 | Dye | 99/583 |
| 3,713,468 | 1/1973 | Walsh | 99/580 |
| 3,841,212 | 10/1974 | Powell | 99/571 |
| 4,377,970 | 3/1983 | Kenkel | 99/572 |
| 4,438,687 | 3/1984 | McNiel | 99/571 |
| 4,603,624 | 8/1986 | Greenblatt | 99/572 |
| 4,665,814 | 5/1987 | Harborne et al. | 99/579 X |
| 5,092,231 | 3/1992 | Smith | 30/120.2 X |
| 5,505,123 | 4/1996 | Kim | 99/579 |
| 5,711,213 | 1/1998 | Thomson | 99/571 |

OTHER PUBLICATIONS

Internet advertisement for Dynamic Nutcracker and Kinetic Nutcracker, by Lee Manufacturing Co., Dallas, Texas, pp. 1–2, Aug. 8, 1999.

*Primary Examiner*—Timothy Simone
*Attorney, Agent, or Firm*—Robert H. Frantz

[57]           ABSTRACT

An apparatus for cracking nuts is disclosed which employs a striker mechanism to apply a sharp force to the shell of a nut in order to fracture it. The nut is held in a chamber consisting of an anvil and a cup, with a spring-loaded striker being cocked and released by the single motion of a lever. In the lever's normal raised state, the anvil and cup are separated to allow for insertion of the uncracked nut. As the lever is lowered, the anvil is gently closed down upon the nut to secure it with a light force between the anvil and the cup. As the lever continues its travel downward, the striker is cocked and released, imparting an impulse force on the cup and the nut, thereby cracking the shell of the nut with a predetermined force independent of the size of the nut. A fragment shield integral to the lever is lowered into place along either side of the cracking chamber as the lever is lowered, providing a simple and reliable safety mechanism. The shell, shards, and nut meat are directed to a catch bowl below the cracking chamber as the lever is raised and as the anvil releases the cracked nut.

11 Claims, 4 Drawing Sheets

NUT CRACKING APPARATUS

TECHNICAL FIELD OF THE INVENTION

This invention pertains to the arts of devices and systems to crack and shell nuts such as pecans. This invention relates in particular to manual nut cracking devices which are suitable for medium to high-volume operation.

CROSS-REFERENCE TO RELATED APPLICATIONS

Not applicable.

FEDERALLY SPONSORED RESEARCH AND DEVELOPMENT STATEMENT

This invention was not developed in conjunction with any Federally-sponsored contract.

MICROFICHE APPENDIX

Not applicable.

BACKGROUND OF THE INVENTION

Existing technology for cracking and shelling various types of nuts is well known within the art, including devices ranging from simple manual tools which resemble specialized pliers, to sophisticated motorized systems suitable for high-volume product yield.

The first substantial problem to be addressed by most mechanical and automated systems is the problem of applying force to a nut with enough magnitude to crack the shell, while leaving the meat of the nut undamaged or uncrushed. To further complicate this problem, nuts to be shelled are of varying size, so a cracking chamber which holds a nut must accommodate a variety of shapes and sizes of nuts. Additionally, as the nut is cracked, shards or pieces of shell material may be ejected from the cracking chamber, producing a potential safety hazard for the operator, an undesirable mess in the work area, and a potential reliability problem for the device if the shell fragments enter the workings of the mechanism.

Existing tools for meeting all of these needs have been either extremely simple, manually operated systems, or fairly complex automated systems. The device disclosed in U.S. Design Pat. No. 298,099 to Luc is an example of the former type of simple, manual tool. While simple manual tools such as this one allow precise cracking of the shell with minimized damage to the meat coupled with a reliable mechanism, this tool is not particularly well suited for higher-volume cracking operation.

Motorized systems of the latter type, such as those disclosed in U.S. Pat. No. 4,603,624 to Greenblatt; U.S. Pat. No. 5,711,213 to Thomson (Kirk); and U.S. Pat. No. 5,505,123 to Kim are suitable for higher volume applications, but may also exhibit higher failure rates and cost of operation due to the complexity of the mechanism.

A number of nut cracking devices, especially those which are lever-actuated, are known which address the needs and issues of medium-volume nut crackers. Devices such as those disclosed in U.S. Pat. No. 4,377,970 to Kenkel and U.S. Pat. No. 4,438,687 to McNiel provide simpler mechanisms with higher volume capabilities, but may still exhibit problems with adjustment to varying nut sizes without undesired nut meat damage, and may still exhibit safety problems with flying shell pieces.

Therefore, there exists a need in the art for a nut cracking device suitable for moderate volume nut cracking operation, with better reliability and serviceability due to improved mechanical system design, operable by a single operator, and which provides improved handling of varying sizes of nuts while providing enhanced safety for the operator.

SUMMARY OF THE INVENTION

The present invention employs a striker mechanism to apply a sharp force to the shell of a nut in order to fracture it. The nut is held in a chamber consisting of an anvil and a cup, with a spring-loaded striker being cocked and released by the single motion of a lever. In the lever's normal raised state, the anvil and cup are separated to allow for insertion of the nut. As the lever is lowered, the anvil is gently closed down upon the nut to secure it with a light force between the anvil and the cup. As the lever continues its travel downward, the striker is cocked and released, imparting an impulse force on the cup and the nut, thereby cracking the shell of the nut with a pre-determined force independent of the size of the nut. A fragment shield integral to the lever is lowered into place along either side of the cracking chamber as the lever is lowered, providing a simple and reliable safety mechanism. The shell, shards, and nut meat are directed to a catch bowl below the cracking chamber as the lever is raised to its normal position, and the anvil releases the cracked nut.

BRIEF DESCRIPTION OF THE DRAWINGS

The figures presented herein when taken in conjunction with the disclosure form a complete description of the invention.

DETAILED DESCRIPTION OF THE INVENTION

The nutcracker apparatus disclosed herein provides a reliable mechanism which automatically adjusts to varying sizes of nuts to be cracked. Each nut is cracked with the same amount of force, allowing damage to the meat of the nut to be minimized. It is manually operated, but designed for rapid loading and unloading so as to be useful for medium to higher volume nut cracking applications. The mechanism is preferably realized using common hardware, allowing it to be serviced and maintained easily. The integral safety shield protects the user's face and eyes from flying shell pieces, while also directing the fragments to a catch bowl which reduces the mess created during operation.

Figure 1:
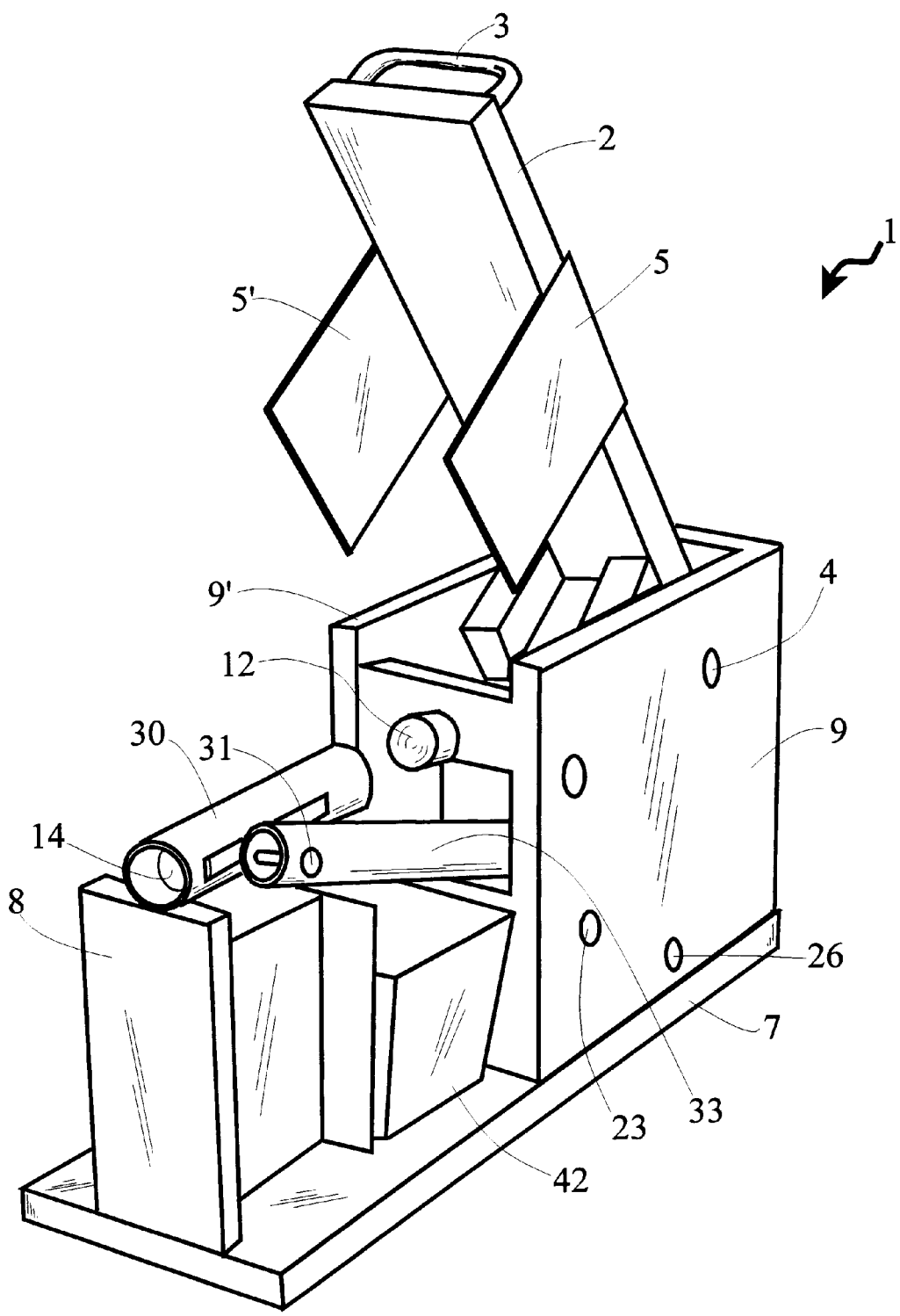
FIG. 1 presents a view of the assembled nutcracker with a catch bowl.
Figure 2:
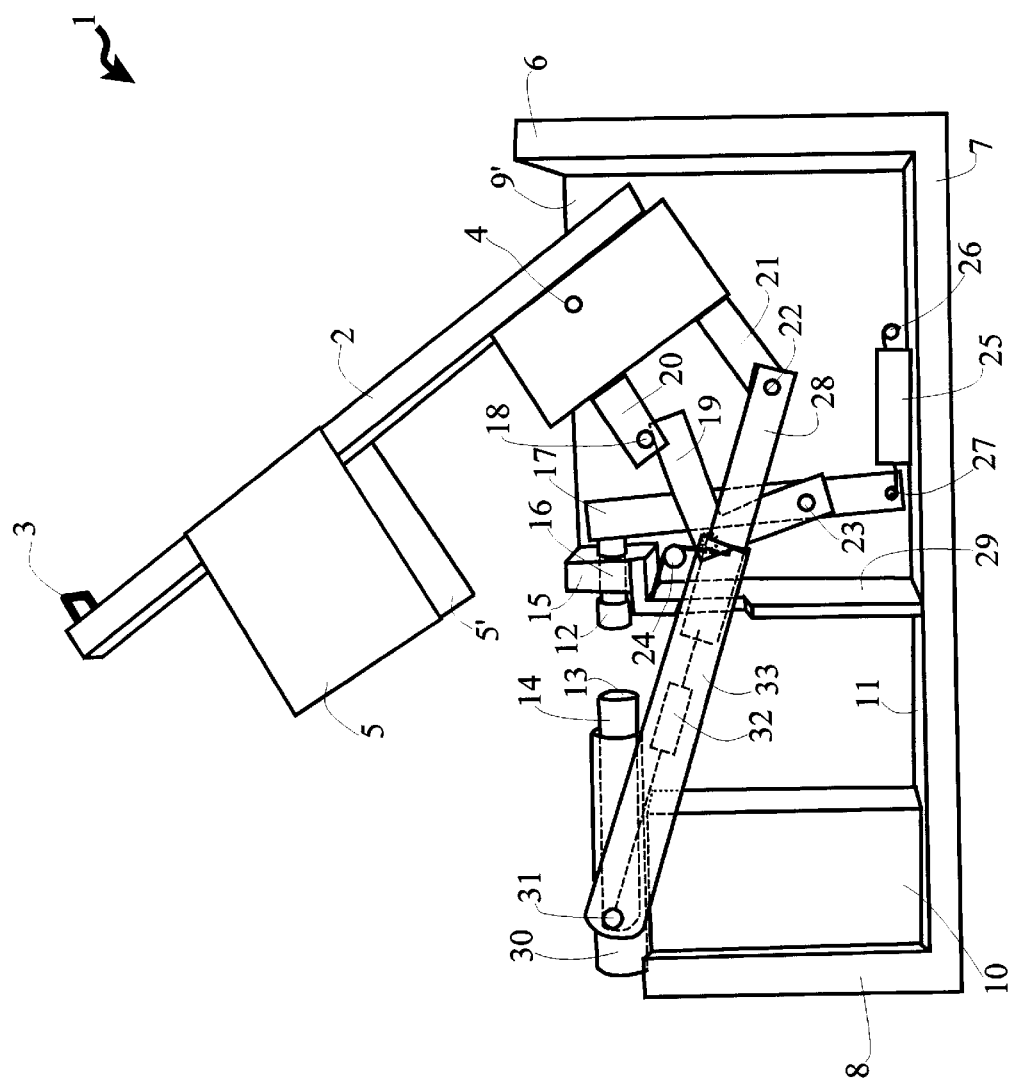
FIG. 2 shows a side internal view of the device with the actuating lever in its normal upright position, and the cracking chamber open.

Turning to FIG. 2, the nutcracker (1) is shown from a side view with the side panel removed, so as to allow viewing of the mechanism in operation. The housing is preferably constructed of ¾ inch wood, but may be alternatively made of suitable metal or plastic. The housing consists of a base (7), a right side (6) and a left side (8), and a back panel (9'). The front panel (shown as reference 9 in FIG. 1 but not shown in FIG. 2) fits on the front of the unit, symmetrical to the back panel (9'), to provide a complete enclosure around the striker assembly. A mid panel (29) protects the mechanism from flying debris. A catch bowl (not shown in FIG. 2) is placed in the catch bowl area (11) on the base (7). A left support (10) completes the main housing.

The nutcracker (1) is provided with an actuating lever (2), which pivots about a bolt (4) mounted through the front panel (9) and back panel (9'). This pivot bolt (4) is preferably a steel bolt of 3/16 inch diameter or larger in order to provide adequate structural support during the cracking operation, and it may be secured using one or two nuts with a lock washer. The upper end of the lever (2) is equipped with a handle (3) for the operator to use to pull the lever downward. Two shield panels (5) and (5') are provided on the front and back sides, respectively, attached to the lever (2).

The cracking chamber consists of an anvil (14) on the left and a cup (12) on the right. The anvil (14) has a concave shaped nut receptacle (13) milled into it, and it is slidably held in place by an anvil carrier (30). The anvil (14) is fabricated of steel, the anvil carrier (30) is preferably fabricated of plastic or PVC pipe of suitable diameter to receive the anvil. The anvil carrier (30) is provided with a slot along its front side, through which an anvil positioning bolt (31) extends from the left end of the anvil.

The cup (12) also is provided with a concave indentation to receive a nut for holding, and the right end of the cup (12) slidably extends through (16) a vertical housing support (15). To facilitate adjustment of the gap to fit each nut to be cracked, the cup is allowed to travel sideways only a limited amount through the vertical housing support (15). The cup (12) is preferably fabricated from aluminum.

The striker assembly consists of a striker (17), which is preferably constructed of a metal bar having a thickness of 3/32 to 1/8 inch. The striker (17) pivots about a striker axis bolt (23), which is a similar bolt and is mounted similarly to the lever pivot bolt (4). A pair of right-angle steel corner braces mounted on either side of the striker (17) are positioned such that they also pivot around the striker axis bolt (23) and form a set of races (19). The two corner braces are also affixed to each other using a bolt with nuts or spacers between them at the corner (see FIG. 3 reference 41) of the braces such that the striker is disposed between them but not bound by them. At the lower end of the striker (17) is attached a strong cracking spring (25) through a spring attachment hole (27). The other end of the cracking spring (25) is attached rigidly to the housing, such as another bolt (26) extending through the front and back panels of the housing.

Towards the lower end of the actuating lever (2) is located a striker activating trigger (20), which contacts the upper edge of the races (19) as shown in FIG. 2 using a bolt or pin (18) protruding from the trigger (20). This is preferably constructed of steel bar stock similar to that used to construct the striker. At the lowest end of the lever (2) is located a nut fit adjustment actuator (21), which similarly is constructed of steel bar stock. It is rotatably attached (22) using a nut and bolt to the lower end of a nut adjustment bar (33).

The nut adjustment bar (33) provides the mechanism which independently adjusts to the size of the nut placed between the anvil (14) and the cup (12). The upper section of the nut adjustment bar (33) is constructed of hollow pipe, and is rotatably affixed to the anvil positioning bolt (31). Within the hollow pipe of the nut adjustment bar (33) is disposed a slidable extension rod (28), connected by a light adjustment spring (32) as shown. As force is applied to pull the end of the extension rod (28) down and towards the right, the extension rod (28) slides within the hollow pipe, and the adjustment spring (31) is stretched. This causes a light force to be applied towards the right on the anvil positioning bolt (31), which in turn causes the anvil (14) to slide in the anvil carrier (30) towards the right, thereby reducing the gap between the cup and the anvil.

Figure 3:
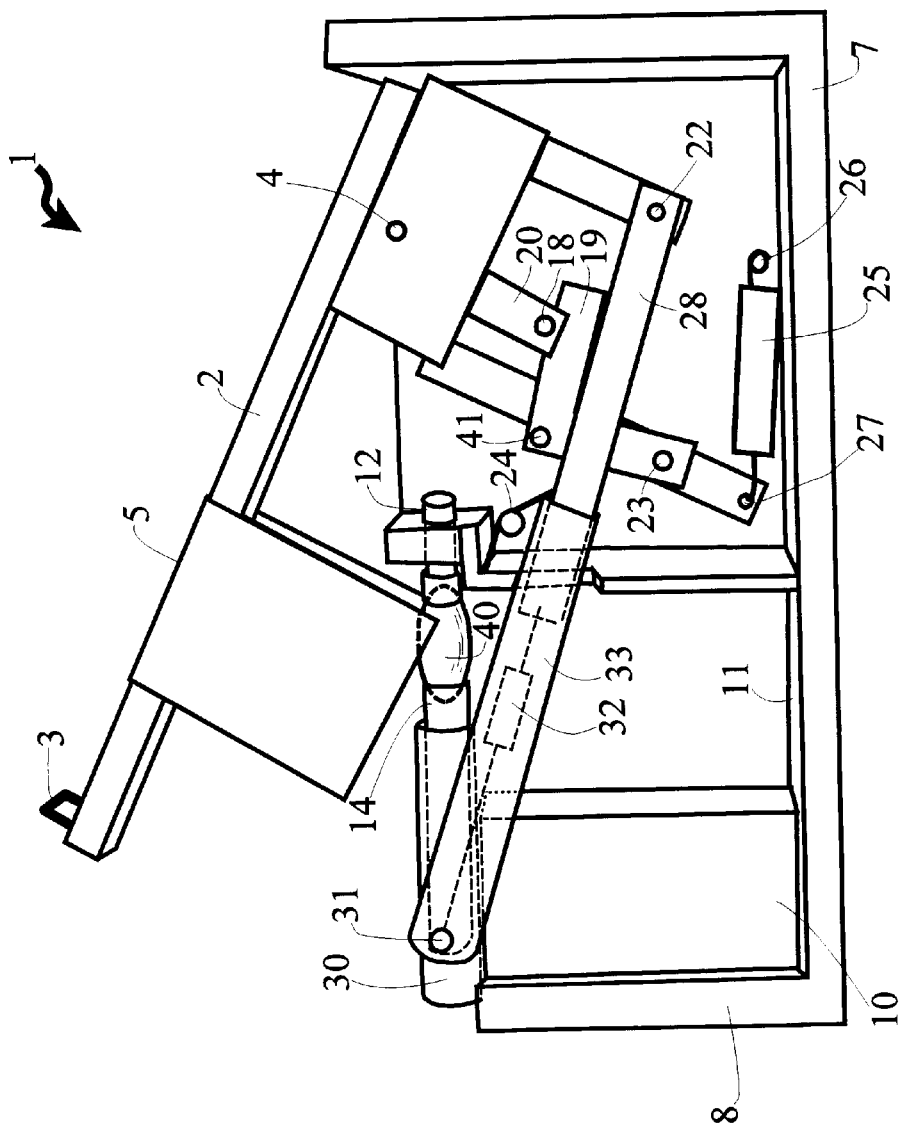
FIG. 3 depicts the device during the cracking process as the actuating lever is lowered, with a nut held in the cracking chamber, and the shield boards lowering into place on either side of the nut.

As shown in FIG. 3, to operate the nutcracker, a nut (40) is placed between the anvil (14) and the cup (12). The operator then uses the handle (3) to lower the actuating lever (2). As FIG. 3 shows midway through the lever's travel to its lowest "finished" position, the striker activating trigger (20) presses the races downwards and towards the right, rotating the races (19) clockwise as the lever is lowered. This causes the cracking spring (25) to be stretched and loaded with energy. Simultaneously, the adjustment bar extension (28) is pulled farther from the anvil positioning bolt (31), causing a light but firm force to be applied to the nut (40) to hold it in the cracking chamber.

Figure 4:
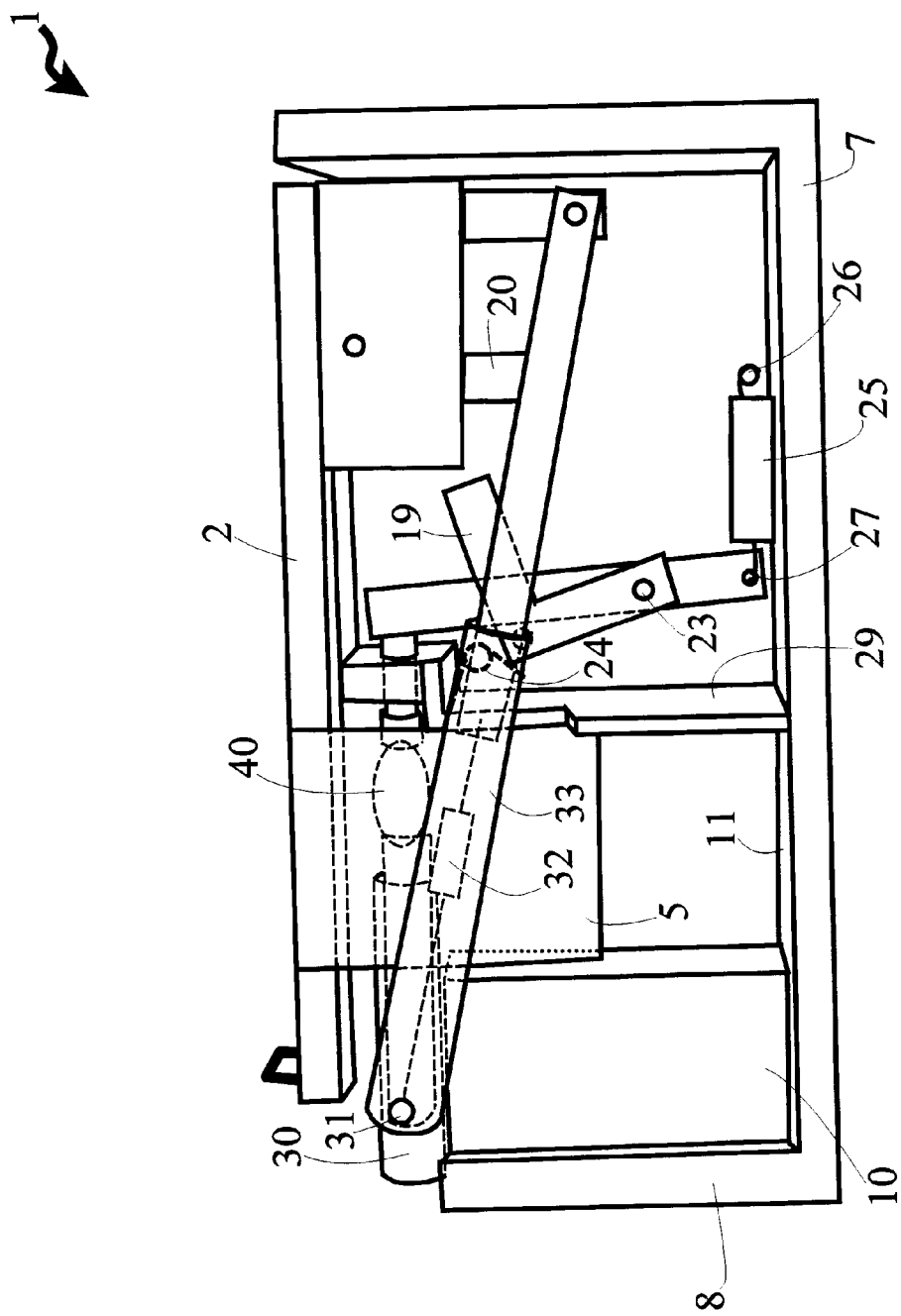
FIG. 4 illustrates the device after the hammer has been released when the actuating lever is lowered to its "finished" position.

As the lever reaches its "finished" position, shown in FIG. 4, the striker activating trigger (20) has traveled off of the right end of the races (19), allowing the striker to be accelerated counter-clockwise by the cracking spring (25), colliding with the right end of the cup (12). This imparts an impulse of energy to the shell of the nut (40), which cracks it but does not crush it. The tension in the nut adjustment bar (33) continues to hold the cracked nut in the cracking chamber, while flying shell shards are deflected by the shield boards (5 and 5') and directed downwards towards a catch bowl.

As the lever is raised towards its upper position again, the striker activating trigger (18 and 20) comes into contact with the races (19), but this time from the underside of the races. A small torsion spring (24) allows the races to be pressed slightly counterclockwise to allow the striker activating trigger (20) to clear the races, and then to be correctly repositioned as the trigger clears the races.

FIG. 1 shows a perspective view of the assembled nutcracker, with the front panel (9) and a catch bowl (42) in place.

While the disclosure contained herein has set forth a preferred embodiment of the invention, and the fundamental mechanical components used within the invention are well known within the art, it will be appreciated by those who are skilled in the art that variations to the combination of elements, materials and steps disclosed can be made without departing from the scope and spirit of the invention.

What is claimed is:

1. An apparatus for cracking nuts, comprising:

a horizontal base member;

a left vertical support member rigidly disposed on said base member, said left vertical support member having a top support surface;

a right vertical support member rigidly disposed on said base member, said right vertical support member having a passage way formed therein horizontally;

an cup member slidably disposed within said passage way of said right vertical support member, said cup member having a left end and a right end, said left end being provided with a substantially concave surface suitable for reception of a nut to be cracked;

an anvil carrier disposed on said top support surface of said left vertical support member, and disposed in linear alignment with said cup member;

an anvil member slidably disposed in said anvil carrier, said anvil member having a left end and a right end, said right end of the anvil member being provided with a substantially concave surface suitable for reception of a nut to be cracked, and said disposition of the anvil member allowing rightward travel of the anvil member towards said cup member, thereby forming a cracking chamber between the right end of the anvil member and the left end of the cup member;

a spring-loaded striker member, pivotally disposed to strike said right end of the cup member when rotated clockwise to load the spring with energy, and then released to allow the striker member to accelerate counter-clockwise to collide with the right end of the cup member, thereby causing a cracking action by imparting the stored energy in the spring to the cup member and a nut held in said cracking chamber;

a lever member pivotally disposed to actuate the spring-loaded striker member on a single downward operation by an operator; and at least one shield panel disposed on said lever member such that said shield panel is lowered into a position to cover said cracking chamber as said lever member is operated downwardly, thereby providing a physical barrier to contain pieces of nut and shell as they may be ejected during the cracking action.

2. The apparatus of claim 1 wherein said cup member is fabricated of a metal material.

3. The apparatus of claim 2 wherein said cup member is fabricated substantially of aluminum.

4. The apparatus of claim 1 further comprising a catch-bowl disposed between said right vertical support member and said left vertical support member substantially on said horizontal base member in proper arrangement to receive falling shell and nut pieces resulting from the cracking action.

5. The apparatus of claim 1 further comprising an adjustment means, comprising:

a spring-loaded, slidably extendable adjustment bar, said adjustment bar having a lower right end and an upper left end;

a pivotal interconnect between said adjustment bar upper left end and said left end of the anvil member; and a pivotal interconnect between said adjustment bar lower right end and said lever member such that said adjustment bar is extended against the pull of its spring as the lever member is moved downward, thereby transferring a rightward force to the anvil member and causing the anvil member to slide towards the right within said anvil carrier in order to provide a holding and capture force on the nut to be cracked.

6. The apparatus of claim 1 wherein said horizontal base member, the left vertical support member, and the right vertical support members are fabricated of wood.

7. The apparatus of claim 1 wherein said horizontal base member, the left vertical support member, and the right vertical support members are fabricated of metal.

8. The apparatus of claim 1 wherein said horizontal base member, the left vertical support member, and the right vertical support members are fabricated of plastic.

9. The apparatus of claim 1 wherein said anvil carrier is fabricated of a pipe material.

10. The apparatus of claim 9 wherein said anvil carrier is fabricated of polyvinyl chloride (PVC) pipe.

11. The apparatus of claim 1 further comprising a striker trigger means comprising:

a race member disposed to concentrically rotate in conjunction with said striker member in a clockwise movement, said race member being provided with a catch device to cause said striker member to rotate clockwise as said race member is rotated clockwise; and a trigger actuator member disposed on said lever member such that said trigger member actuates a clockwise rotation of said race member and said striker member throughout an initial portion of the downward travel of the lever member, and such that said contact between the trigger actuator member the race member is released during a final portion of the downward travel of the lever member, thereby releasing the race member and the striker member to cause the cracking action.

* * * * *